(12) United States Patent
Hosemann et al.

(10) Patent No.: US 12,479,692 B2
(45) Date of Patent: Nov. 25, 2025

(54) METHOD AND DATA NETWORK FOR COMMUNICATING DATA CONTENT, IN PARTICULAR IN AN ELEVATOR SYSTEM

(71) Applicant: Inventio AG, Hergiswil (CH)

(72) Inventors: Axel Hosemann, Auw (CH); Andre Krummenacher, Neuenkirch (CH)

(73) Assignee: INVENTIO AG, Hergiswil (CH)

( * ) Notice: Subject to any disclaimer, the term of this patent is extended or adjusted under 35 U.S.C. 154(b) by 991 days.

(21) Appl. No.: 17/597,338

(22) PCT Filed: Jun. 30, 2020

(86) PCT No.: PCT/EP2020/068379
§ 371 (c)(1),
(2) Date: Jan. 4, 2022

(87) PCT Pub. No.: WO2021/004835
PCT Pub. Date: Jan. 14, 2021

(65) Prior Publication Data
US 2022/0234865 A1  Jul. 28, 2022

(30) Foreign Application Priority Data
Jul. 11, 2019  (EP) ..................................... 19185769

(51) Int. Cl.
*B66B 1/20* (2006.01)
*B66B 1/28* (2006.01)
(Continued)

(52) U.S. Cl.
CPC .............. *B66B 1/3453* (2013.01); *B66B 1/28* (2013.01); *B66B 1/3461* (2013.01); *B66B 5/0018* (2013.01); *H04L 67/12* (2013.01)

(58) Field of Classification Search
CPC ....... B66B 1/3453; B66B 1/28; B66B 1/3461; B66B 5/0018; H04L 67/12
(Continued)

(56) References Cited

U.S. PATENT DOCUMENTS 4,724,932 A * 2/1988 Tauchi .................. B66B 5/0025
187/399
4,823,914 A * 4/1989 McKinney ............ B66B 5/0037
187/393
(Continued)

FOREIGN PATENT DOCUMENTS

CH  543837 A  10/1973
CN  1249592 A  4/2000
(Continued)

*Primary Examiner* — Erick D Glass
(74) *Attorney, Agent, or Firm* — Shumaker, Loop & Kendrick, LLP

(57) ABSTRACT

A method and a data network for communicating data content, particularly useful in an elevator system, includes a master unit and a plurality of slave units that are connected to one another via data communication paths to exchange data telegrams having a large number of bits between one another. The master unit and the slave units are connected in series to form a chain via the data communication paths wherein a data telegram is transmitted from the master unit to a last slave unit on an outward data path. The last slave unit initiates a data return path by returning the data telegram to the master unit. The data telegram is modified by the slave units exclusively during the data return path and at least one slave unit begins to compile information requested by the master unit immediately after receiving and evaluating the data telegram.

16 Claims, 4 Drawing Sheets

(51) Int. Cl.
*B66B 1/34* (2006.01)
*B66B 5/00* (2006.01)
*H04L 67/12* (2022.01)

(58) Field of Classification Search
USPC .......................................................... 187/247
See application file for complete search history.

(56) References Cited

U.S. PATENT DOCUMENTS

| | | | |
|---|---|---|---|
| 5,012,899 A * | 5/1991 | Iwata | B66B 1/18 |
| | | | 187/277 |
| 2009/0210596 A1 | 8/2009 | Furuya | |
| 2017/0222829 A1 | 8/2017 | Kessler et al. | |

FOREIGN PATENT DOCUMENTS

| | | |
|---|---|---|
| CN | 1442812 A | 9/2003 |
| DE | 102010003448 A1 | 10/2011 |
| DE | 102015117937 B3 | 1/2017 |
| EP | 1892872 A2 | 2/2008 |
| EP | 3048536 A1 | 7/2016 |
| JP | H11136243 A | 5/1999 |
| JP | 2006094302 A | 4/2006 |
| JP | 2009298578 A | 12/2009 |
| JP | 2011119999 A | 6/2011 |
| JP | 2017135709 A | 8/2017 |
| WO | 2006136201 A1 | 12/2006 |
| WO | 2015075249 A2 | 5/2015 |
| WO | 2017191186 A1 | 11/2017 |
| WO | 2019081230 A1 | 5/2019 |

* cited by examiner

METHOD AND DATA NETWORK FOR COMMUNICATING DATA CONTENT, IN PARTICULAR IN AN ELEVATOR SYSTEM

FIELD

The present invention relates to a method for communicating data content within a data network. The invention also relates to a data network configured to carry out the method according to the invention. The invention also relates to an elevator system equipped with such a data network.

BACKGROUND

Data networks are used in particular to exchange data or signals between different devices or machines. For example, field devices arranged in a distributed manner can exchange data with a central controller and/or with one another via a data network. Each of the field devices can, for example, have a sensor and/or an actuator. Measurement data recorded by the sensor or other signals can then be transmitted to the controller via the data network. Alternatively or in addition, data can be transmitted from the controller to the sensor or an actuator, for example in the form of control signals.

Possible configurations of a data network and a method for communicating data content by means of the data network are described below using the example of a data network in an elevator system. It should be pointed out, however, that embodiments of the data network described herein and of the communication method that can be carried out therewith can also be used in various other applications. The approach described herein is particularly suitable for applications in which a large number of field devices are to communicate with a controller and the field devices are arranged at a relatively large distance from one another.

In an elevator system, displacements of an elevator car along an elevator shaft are generally brought about centrally by a controller which controls the operation of a drive machine by means of which the elevator car is displaced. In order to in particular be able to guarantee safety during the operation of the elevator system, many safety devices are usually distributed over the elevator system in the form of, for example, sensors, detectors and/or safety switches, by means of which local conditions within the elevator system can be identified.

For example, in elevator systems in which the elevator car can approach a large number of floors, a floor door is provided on each of the floors, which door can optionally block or allow access between a floor and the elevator shaft. The elevator car should only be able to be relocated when the floor doors on all floors are closed. For this purpose, a so-called door sensor or door switch can be provided on each floor door, for example, which generates a suitable signal when the associated floor door is correctly closed and locked.

Conventionally, such door switches were connected in series to form a safety chain. The safety chain could be monitored by the elevator control and a displacement of the elevator car could be permitted only if the entire safety chain and thus all door switches integrated therein were closed.

However, in the conventional implementation of the safety chain described, in the case in which the safety chain was interrupted, it was not readily apparent which of the door switches integrated therein is currently open and causing the interruption. In addition, previously only the very simple, brief information relating to the closed status of the elevator doors has been transmitted within the safety chain, but no further information.

It is also customary in elevator systems to provide additional sensors or other safety-relevant devices by means of which, for example, locally prevailing conditions in the elevator system can be measured so that the information relating thereto can be used by the elevator controller. For example, sensors can be provided on each floor, by means of which it can be determined whether the elevator car on the floor in question is located within a tolerance range above or below a stop position. This information can be used, for example, to make the elevator doors open shortly before the stop position is reached. In this case, however, the elevator controller must know from which of the many sensors a corresponding signal originates. Conventionally, this can mean that each of the sensors has to be wired to the controller individually and thus in a complex manner.

In order to overcome the disadvantages mentioned, among other things, data networks are used in modern elevator systems, via which data and signals can then be exchanged between a large number of sensors and the elevator controller.

In this context, a data network can be understood to mean an amalgamation of various technical, primarily independent electronic systems such as computers, sensors, actuators, agents and other electronic components, the amalgamation allowing the individual systems to communicate with one another. The aim here may be a shared use of resources. The communication typically takes place using predefined protocols which, among other things, specify the way in which data content is to be structured and transmitted. The data content is usually embedded as user data in a so-called data telegram with a structure specified by the protocol. In the data network, hierarchical management is usually implemented with regard to access to a common resource, in which one subscriber in the data network acts as a master unit and all other subscribers act as slave units. The master unit alone has the right to unsolicited access to the common resource, such as a data transmission channel that is to be used jointly. As a rule, the slave units cannot access the common resource of their own accord, but have to wait until they are asked by the master unit or indicate to the master unit via a connection past the common resource that they want to be asked.

In addition to the safety-relevant information that was conventionally transmitted within the safety chain, further non-safety-relevant information can also be transmitted via the data network. For example, extensive non-safety-relevant information for a complex call system of an elevator system can be transmitted via the data network, for example with an image display on touchpads.

Conventionally, data networks have been used in this context which, for example, use a CAN bus architecture (CAN-Controller Area Network).

In even more modern elevator systems, the aim is to use alternative data networks which, for example, are more cost-effective, easier to install, offer advantages in error analysis and/or enable higher or more safe data transmission.

For example, data networks known as Ethernet have been developed. In particular, an Ethernet standard IEEE 802.3bw. 100BASE-T1 has been developed, which enables fast and robust data communication over short distances. These data networks were often developed with regard to requirements such as those encountered in automotive applications. In particular, special electronic components have been developed for such data networks, which are also referred to as a physical layer or PHY for short. Such PHYs are now standard components and are available inexpensively.

It appears to be advantageous to be able to also use the already known and cost-effective electronic components, in particular PHYs, which are already fully developed for automotive applications, for data networks for other applications, in particular for use in elevator systems.

However, this is complicated by the fact that the data networks developed for use in automobiles and their electronic components, in particular their PHYs, were developed for data transmission over only short distances of typically less than 15 m. In the case of a data network to be used in an elevator system, however, one or more sensors are typically provided on each floor, which are intended to communicate via the data network with a controller that is relatively far away. If the data network is formed, for example, from a large number of electronic components connected in series, it therefore appears necessary to repeat or amplify a signal to be transmitted via the data network on each floor. In a conventional Ethernet data network, this would require an electronic component, for example, in which a microcontroller reads an incoming data record or an incoming signal sequence, then verifies a checksum (e.g. an Ethernet CRC32) sent to check the integrity of the transmitted data and, if necessary, reads out data from the data record or stores its own data in the data record and then transmits the data record, if necessary with an increased signal strength and/or a new checksum, to the next electronic component with a new address. A cycle to be used for this already leads to a significant time delay for a data record of 1500 bytes, for example. In applications such as in very tall elevator systems, in which a great number of repetitions (for example more than 100 repetitions) have to be implemented on a large number of electronic components connected in series, considerable delays can be caused in this way in data transmission from a remote component via a large number of intermediate components to a central controller, even at high data transmission rates of, for example, 100 Mbps. This can cause delays in the millisecond range, for example a few tens of milliseconds. This can inhibit or even prevent fast and/or reliable function of the data transmission in such applications.

Further developed data networks including data transmission protocols that can be used therein have been developed for special applications. For example, a special Ethernet fieldbus is known under the name "EtherCAT," which offers very fast data transmission, a largely free choice of a topology to be used, versatile applicability, simple implementation, relatively low costs for the electronic components to be used, high functional safety and/or other advantages.

Furthermore, DE 10 2010 003 448 A1 describes an addressing method and a communication network with such an addressing method and DE 10 2015 117 937 B3 describes a communication network, a method for operating such a communication network, and subscribers in a communication network.

US 2017/0222829 A1 describes a method for communicating data content within a data network, in which the subscribers are connected to one another in series to form a chain. A datagram sent by a subscriber is appended to a data telegram previously received by the subscriber.

SUMMARY

Among other things, there may be a need for an alternative method for communicating data content within a data network and for a data network configured for such data communication. In particular, there may be a need for a method for communicating data content within a data network and for a data network configured for such data communication, in which a faster and more reliable exchange of data, in particular also over longer distances of several tens of meters up to several hundred meters, is made possible using easily and inexpensively available electronic components. Furthermore, there may be a need for a communication method or data network which can be easily configured and/or flexibly adapted to different application conditions. Furthermore, there may be a need for an elevator system which is equipped with such a data network.

A need of this kind can be met by the subject matter according to any of the advantageous embodiments that are defined in the following description.

According to a first aspect of the invention, a method for communicating data content within a data network, in particular in an elevator system, is proposed. In this case, the data network comprises a master unit and a plurality of slave units. The master unit and the slave units are connected to one another via data communication paths in order to exchange data telegrams consisting of a large number of bits between one another. Each data telegram comprises a header, a datagram region and a checksum. The datagram region is configured for the serial storage of a plurality of datagrams. Each datagram comprises a piece of data content to be communicated. The checksum must be clearly calculated on the basis of the bits in the remainder of the data telegram. The master unit and the slave units are connected to one another in series to form a chain via the data communication paths. The master unit transmits a data telegram to a first slave unit on an outward data path up to a last slave unit. Each of the slave units, with the exception of the last slave unit, forwards a data telegram received from a direction from the master unit at a first data connection in the direction toward the last slave unit via a second data connection. The last slave unit initiates a data return path by returning a data telegram received from the direction from the master unit at a first data connection in a direction toward the master unit via the first data connection. During the data return path, each of the slave units forwards a data telegram received from a direction from the last slave unit at the second data connection in the direction toward the master unit via the first data connection. The slave units have a processor unit for forwarding and modifying the data telegram. At least one, in particular all of the processor units are configured to read and evaluate the data telegram on the outward data path and, if the data telegram contains a request to the particular slave unit to transmit information to the master unit on the data return path, to begin compiling the requested information immediately after receiving and evaluating the corresponding instruction.

According to a second aspect of the invention, a data network for communicating data content within the data network, in particular in an elevator system, is proposed. The data network is configured to carry out a method according to an embodiment of the first aspect of the invention.

Such a data network for communicating data content within the data network, in particular in an elevator system, comprises a master unit and a plurality of slave units. The master unit and the slave units are connected to one another via data communication paths in order to exchange data telegrams consisting of a large number of bits between one another. As already stated above, each data telegram comprises a header, a datagram region and a checksum. The master unit and the slave units are connected to one another in series to form a chain via the data communication paths. The master unit has a master processor unit and at least one data connection, and each of the slave units has a processor unit and a first and a second data connection. The master unit is configured to transmit a data telegram to a first slave unit via its data connection on an outward data path to a last slave unit. Each of the slave units, with the exception of the last slave unit, is configured to forward a data telegram received from a direction from the master unit at its first data connection in the direction toward the last slave unit via its second data connection and to forward a data telegram received from a direction from the last slave unit at the second data connection in the direction toward the master unit via its first data connection. The last slave unit is configured to initiate a data return path by returning a data telegram received from the direction from the master unit at its first data connection in a direction toward the master unit via the first data connection. Each of the slave units is configured to modify the data telegram exclusively during the data return path and at least one, in particular all of the processor units of the slave units are configured to read and evaluate the data telegram on the outward data path and, if the data telegram contains a request to the particular slave unit to transmit information to the master unit on the data return path, to begin compiling the requested information immediately after receiving and evaluating the corresponding instruction.

According to a third aspect of the invention, an elevator system having a data network according to an embodiment of the second aspect of the invention is proposed.

Possible features and advantages of embodiments of the invention can be considered, inter alia and without limiting the invention, to be based upon the concepts and findings described below.

As already noted in the introduction, the aim is to use modern data network structures in applications such as high elevator systems, in which data are to be transmitted over long distances and many subscribers are to be integrated in the data network in the form of electronic components.

The subscribers in the data network are connected to one another via one or more data communication paths, which can also be referred to as data transmission channels, so that data can be exchanged between the subscribers. A data communication path can be implemented technically in different ways, for example by cables running between the subscribers. In most cases, adjacent subscribers are wired together using two or more cables.

In conventional data networks that function, for example, according to the Ethernet standard, data content to be transmitted is exchanged between an electronic component functioning as a transmitter and a component functioning as a receiver. The transmitter can be a higher-level master unit in a hierarchy and the receiver can be a lower-level slave unit. In certain constellations, such as in response to a request from the master unit, however, a slave unit can also act as a transmitter and send data content to the master unit or another slave unit.

The pieces of data content are usually embedded in a data telegram. The data telegram generally comprises at least a header, a datagram region and a checksum. The header usually includes, among other things, information that is necessary for the orderly implementation of data communication, such as a target address, type specifications, etc. The datagram region is provided to receive the data content to be transmitted with the data telegram in the form of datagrams as a kind of payload. A plurality of datagrams can be stored in the datagram region. The checksum, such as a CRC32 (cyclic redundancy check with 32 bits), is used to detect errors, is calculated individually for each data telegram and is clearly derived from taking into account all of the bit values contained in the data telegram.

In a conventional data network, a component participating in the data network sends such a data telegram, specifying a destination address, to an adjacent component also participating in the data network. The data telegram is typically read completely there. The integrity of the transmitted data can then be checked by comparing the checksum sent with the bit values in the data telegram and thus checking the content of the data telegram for correctness. The data which are expected from the particular component or which are addressed to the particular component are typically extracted from the transmitted data telegram only after these two process steps have been completed. Additionally or alternatively, the component's own data can be stored in the data telegram, a specially assigned memory region typically being provided within the data telegram for each component participating in the data network, in which memory region this component is to store its data. Before the component forwards the possibly modified data telegram to the next component, it calculates an updated checksum and adds this to the data telegram.

The described procedure in conventional data networks is reliable and therefore widespread, but it involves considerable data processing effort. In particular in applications in which a large number of subscribers are to be able to transmit data via a data network, and furthermore in particular in the event that only very short data records, i.e. little data, are to be transmitted from each of these subscribers, there are considerable time delays in data transmission in conventional data networks. This can be due in particular to the fact that the actual user data make up only a small proportion of the total data to be transmitted via the data network and processed by the network subscribers. As a result, a bandwidth effectively used for the transmission of the data content to be forwarded in the data network can be considerably reduced.

In the data communication method according to the invention, the master unit and the slave units are connected to one another in series to form a chain via the data communication paths. The master unit transmits a data telegram to a first slave unit on an outward data path up to a last slave unit. Each of the slave units, with the exception of the last slave unit, forwards a data telegram received from a direction from the master unit at a first data connection in the direction toward the last slave unit via a second data connection. The last slave unit initiates a data return path by returning a data telegram received from the direction from the master unit at a first data connection in a direction toward the master unit via the first data connection. During the data return path, each of the slave units forwards a data telegram received from a direction from the last slave unit at the second data connection in the direction toward the master unit via the first data connection.

In a data network configured to carry out a data communication method configured in this way, the master unit has a master processor unit and at least one data connection and each of the slave units has a processor unit and the first and second data connections. The master unit is configured to transmit a data telegram to a first slave unit via its data connection on the outward data path to the last slave unit. Each of the slave units, with the exception of the last slave unit, is configured, in particular during the outward data path, to forward a data telegram received from the direction from the master unit at its first data connection in the direction toward the last slave unit via its second data connection and, in particular during the data return path, to forward a data telegram received from a direction from the last slave unit at the second data connection in the direction toward the master unit via its first data connection. Furthermore, the last slave unit is configured to initiate the data return path by returning a data telegram received from the direction from the master unit at its first data connection in a direction toward the master unit via the first data connection.

In other words, the topology of the data network presented herein can be linear. The master unit is located on a first side of the data network, which can also be referred to as the beginning or the upper end. The last slave unit is located on an opposite second side of the data network, which can also be referred to as the end or lower end. There are several other slave units between the master unit and the last slave unit. At least the named further slave units are preferably all constructed in the same way. Each of the mentioned further slave units preferably has at least two data connections. Each of the mentioned further slave units is connected to two adjacent slave units via data communication paths, a preceding slave unit being connected to the first data connection and a subsequent slave unit being connected to the second data connection of this slave unit. Exceptions are the first slave unit and the last slave unit. The first slave unit is connected via its first data connection to the master unit and via its second data connection to an adjacent second slave unit. The last slave unit is connected via its first data connection to an adjacent penultimate slave unit, whereas its optionally available second data connection is not connected to any adjacent slave unit.

A data network with the linear, chain-like topology described and the communication method that can be implemented therewith are particularly suitable for applications in which slave units are distributed over long distances and/or data content is to be passed on successively to a large number of slave units. Chain-like data networks of this type are therefore particularly suitable for an application in an elevator system, in which slave units are provided, for example, on each floor and can be connected in series with adjacent slave units on adjacent floors. The master unit can be connected to a first slave unit on a top or bottom floor and the last slave unit can be accordingly located on the opposite bottom or top floor, respectively.

In a data network with such a chain-like topology, a data telegram can first be transmitted from the master unit to the first slave unit. The data telegram can then be passed on successively from the first slave unit to subsequent slave units until it finally reaches the last slave unit. The path covered is referred to as the outward data path. The last slave unit recognizes its status as the last slave unit, for example, from the fact that it lacks a second neighbor, i.e. that no other slave unit is connected to its second data connection. When the last slave unit receives the data telegram, it does not forward it to its second data connection, but rather sends it back to the preceding slave unit via its first data connection. The last slave unit thereby initiates the data return path. The data telegram is then passed on again in the opposite direction from slave unit to slave unit until it is finally transmitted from the first slave unit to the master unit.

The chain-like topology of the data network described and the data communication method to be implemented therewith are particularly advantageous when each of the slave units is configured to modify the data telegram exclusively during the data return path or the data telegram is modified by the slave units exclusively during the data return path.

In other words, the data network with its slave units is configured in such a way that data telegrams are not modified on the outward data path, but are merely passed on unchanged from slave unit to slave unit until they have reached the last slave unit. Each of the slave units recognizes that it is receiving a data telegram at its first data connection and then passes this on, in particular substantially without delay, i.e. on the fly, to its opposite, adjacent slave unit. The outward data path is thus carried out in what is known as a broadcast process. After the last slave unit has initiated the data return path, the slave units then receive the data telegram at their second data connection. On the data return path, the slave units then store the data content to be transmitted thereby in the form of datagrams in the data telegram.

The described procedure of allowing slave units to store their data content in the data telegram exclusively during the data return path allows data transmission between the master unit and the slave units to be established very efficiently and quickly. While the data is being sent, the slave units can listen to the data in the transmitted data telegram; however, the data are not modified, but are forwarded as quickly as possible. The data telegram thus reaches the last slave unit within a very short time. The slave units store their data content in the data telegram on the return path, if necessary, only when the data telegram is returned by the last slave unit.

Listening to the data can also cause a request in the form of polling to be sent to certain addressed slave units so that they can communicate data content to the master unit of their own accord.

The slave units have a processor unit for forwarding and modifying the data telegram. At least one, in particular all of the processor units are configured to read and evaluate the data telegram on the outward data path and, if the data telegram contains a request to the particular slave unit to transmit information to the master unit on the data return path, to begin compiling the requested information immediately after receiving and evaluating the corresponding instruction. In this way, the processor units advantageously begin compiling the requested information at the earliest possible point in time, so that they can be made available very early for transmission to the master unit. The information is transmitted very quickly, so the time for the data return to the master unit is very short.

The requested information is provided in particular in such a way that the microcontroller compiles the information, for example status information, of the slave unit and transmits it to a complex programmable logic device CPLD. As soon as the data telegram is forwarded on the data return path from the corresponding slave unit, the CPLD can integrate the requested information into the data telegram virtually without any loss of time.

Without the described provision of the requested information, there could be a delay in the transmission of the data telegram by a slave unit, in particular that "on-the-fly" transmission is not possible because the information is first determined by the processor unit and would have to be transmitted to a complex programmable logic device CPLD, which would take a certain amount of time.

In particular, the approach described here is used only for the transmission of safety-relevant information. The data telegrams containing the safety-relevant information are identified in the header with a special type specification (Ethertype). The data telegrams identified in this way are then transmitted using the approach described. In addition to the safety-relevant information, non-safety-relevant information can also be transmitted in the same data network as in conventional data networks, for example in accordance with the Ethernet standard. These data telegrams can also be identified by their type specification in the header.

The last slave unit in particular waits for a short, adjustable period of time, for example in the range between 0.2 and 0.8 milliseconds before introducing the data return path. The specified time period is calculated from the point in time at which the last slave unit has completely received the data telegram. This ensures that all slave units have compiled the information requested by the master unit before the data return path has begun.

According to one embodiment of the data communication method described herein, the method can comprise at least the method step of:
   a slave unit receiving a data telegram from the master unit or from an adjacent slave unit and forwarding parts of the data telegram, while it is being received, to another adjacent slave unit or to the master unit.

The method can in particular comprise the further method steps of:
   checking the checksum of the data telegram;
   appending a supplementary datagram after a last already-stored datagram in the datagram region, the supplementary datagram comprising a piece of data content to be communicated by the slave unit; and
   calculating a new checksum on the basis of the bits in the rest of the data telegram expanded by the supplementary datagram and appending the newly calculated checksum to the end of the data telegram.

In other words, as a first measure, an entire data telegram should not have to be read before it is then optionally modified and ultimately forwarded to a subsequent subscriber in the data network. Instead, parts of the data telegram should already be forwarded while other parts of the same data telegram are still being received. In other words, data telegrams should be forwarded "on the fly," while they are being received in one of the slave units participating in the data network, from this slave unit to a subsequent slave unit or to the master unit.

A time delay between receiving part of a data telegram, for example a bit from the data telegram, and forwarding this part of the data telegram to a subsequent subscriber in the data network can be considerably shorter than the time required to transmit the entire data telegram. For example, data received from a slave unit can be forwarded substantially without delay. "Substantially without delay" can mean that a time interval between receiving and forwarding the data requires only a few computing cycles in the slave unit. A number of the computing cycles required can in particular be considerably smaller than the total number of computing cycles required to forward the entire data telegram. In particular, a time offset of less than 500, preferably less than 100, more preferably less than 20 computing cycles between receiving and forwarding can be sufficient. With a data transmission bandwidth of, for example, 100 Mbps or even significantly more, the time offset can thus be significantly shorter than 1 µs, i.e. in the range of from a few 10 ns to a few 100 ns.

The transmission of data "on the fly" can be implemented, for example, by means of a suitable hardware design of the slave units to be used for this purpose. For this purpose, the slave units in particular have a processor unit which, in addition to a microcontroller, has, for example, a complex programmable logic device CPLD and two physical connections, i.e. two PHYs. The CPLD is in particular arranged between the two PHYs and is selected or configured in such a way that it is able to forward data substantially without delay, i.e. while the data of the same data telegram is still being received.

As a second measure, it is proposed to include the data content to be transmitted with a data telegram in a specific manner in the data telegram. The way in which slave units store the data content determined thereby in the data telegram, and in particular the location or memory location at which this data content is to be stored, differs fundamentally from conventional approaches.

In the conventional approaches described above, for example according to the Ethernet standard protocol, in the data network it is generally known in advance how many subscribers, i.e. in particular how many slave units, the data network comprises and this information stored. For each subscriber, a separate memory region is provided in a data telegram, in which memory region this subscriber is to store its data content. In the event that a slave unit does not currently have any data to be stored, the corresponding memory region remains unused.

In contrast to the conventional approach described above, in the approach described here, pieces of data content in the form of datagrams are not stored in the data telegram at a memory location that has already been defined for this purpose. Instead, each slave unit should store the data content to be transmitted thereby in the form of a supplementary datagram in series after a last already stored datagram in the datagram region of the data telegram. In other words, when a slave unit receives a data telegram, it should insert the data content to be sent with this data telegram into the datagram region of this data telegram and thereby store the corresponding datagram directly behind the memory region in which other slave units had previously stored their datagrams. In yet other words, a slave unit is supposed to append the datagram to be transmitted thereby in the datagram region behind datagrams that have already been stored in series.

The described appending of supplementary datagrams behind already stored data programs in the datagram region allows the communication of data content to be implemented in a more flexible and easily configurable manner. In particular, a specially assigned memory location does not need to be reserved in advance in the datagram region of a data telegram for each of the slave units. Instead, a data telegram can initially be relatively short and, for example, only include the header and the checksum and optionally a very short datagram region. The datagram region can initially accommodate no, only one or only a few datagrams. Since the data telegram is passed on successively from slave unit to slave unit, each of the slave units may append its datagram in the datagram region. As a result, the datagram region grows successively. The length of the datagram region automatically adapts to a quantity of the data content to be transmitted by the various slave units.

In contrast to the conventional approach described above, it can thus be avoided that unnecessarily long data telegrams with partially unused memory regions in a datagram region in which a separate memory region has already been provided for each slave unit in advance need to be communicated via the data network. Instead, the data telegram and in particular its datagram region adapts flexibly to the current requirements with regard to the data content to be transmitted and therefore does not need to be specially configured in advance in this regard.

Datagram region can also have a header (PT, VERS, LEN)

Datagram can also have a header (SRC, CNT) and additionally a CRC

The datagram region may be the payload of an Ethernet frame

The approach described herein for communicating data content within a data network can thus differ in particular in terms of a protocol according to which data content is stored in data telegrams, in combination with the way in which the data telegrams are forwarded from slave unit to slave unit on the fly.

In particular, the data network used for this purpose can differ from conventional data networks with regard to the hardware components that are configured to implement such a protocol and such a type of data forwarding.

Similarly to conventional data communication methods or conventional data networks, the checksum of a received data telegram is checked. Such a check typically takes place after the entire data telegram has been received. If an inconsistency is found between the bit values contained in the data message and the checksum of the data message, the missing integrity of the data message can be stored as information, for example in the form of an error message, in the forwarded data message.

After a received data telegram has optionally been supplemented with its own data content or its own datagram, a new checksum is also calculated for the data telegram expanded by the supplementary datagram. This new checksum is then appended to the end of the data telegram and thus transmitted to the following recipient together with the data telegram. The new checksum replaces the previous checksum.

The described procedure of transmitting data telegrams "on the fly" with little delay and appending datagrams to data frames previously stored in the datagram region of a data telegram is particularly advantageous in embodiments of the data communication method and the data network according to the first and second aspects of the invention, respectively. The combination of features of low-delay data transmission "on the fly" as well as the appending of datagrams to file diagrams previously stored in the datagram region of a data telegram, on the one hand, and the feature of the chain-like topology of the data network, on the other hand, lead to positive effects or synergies. For example, when used in an elevator system, a data telegram can be routed very quickly from a master unit along the chain to the last slave unit and then the slave units store their data content sequentially in the data telegram on the data return path.

According to one embodiment of the data communication method described herein, each of the slave units can be configured to actively start data communication with the master unit of its own accord and to send a data telegram to the master unit for this purpose. Each of the slave units should perform collision handling before actively starting a data communication and then send a data telegram of its own accord only if the slave unit is currently not receiving and forwarding a data telegram. For the data network, this means that each of the slave units is configured to perform collision handling before actively starting a data communication and to then send a data telegram of its own accord only if the slave unit is currently not receiving and forwarding a data telegram.

In other words, the slave units can not only be able to forward data content to the master unit only when they are requested to do so by receiving a data telegram. Instead, the slave units can also generate a data telegram of their own accord, i.e. spontaneously, and send it to the master unit via adjacent slave units therebetween. This allows the slave units to actively transmit data content to the master unit if this is deemed necessary depending on the situation.

However, in order to avoid conflicts between the data communication that would otherwise be carried out via the data network and the data communication to be carried out spontaneously by a slave unit, the slave unit should perform collision handling before it actively starts its spontaneous data communication. During this collision handling, the slave unit checks whether a data telegram is currently to be received and forwarded within the scope of the data communication otherwise to be carried out via the data network. The slave unit starts its own data communication and spontaneously sends a data telegram to the master unit only in the event that this does not apply. A microcontroller of such a slave unit can actually be designed for full-duplex operation, but because of the collision handling to be carried out, it can work only in half-duplex operation at least at times.

According to one embodiment, in the data network presented here, the data communication paths can be implemented by means of a twisted double line. In the data communication process to be carried out via this, the data telegrams can then be exchanged via data communication paths in the form of twisted double lines.

In other words, the data communication paths between adjacent slave units and between the first slave unit and the master unit can be implemented by means of hard-wired lines. For the applications described herein, it may be sufficient to provide only two lines, or, in other words, a double line, between adjacent subscribers of the data network. The two lines can be designed as a twisted double line, sometimes also referred to as a "twisted pair," in order to minimize interference voltages that can be caused by inductive coupling.

Since twisted double lines having only two lines extend between adjacent subscribers of the data network, the amount of wiring and/or the amount of material required for the data communication paths can be limited. This can be advantageous in particular in an application such as, for example, in a long elevator system, in which data telegrams have to be transmitted over long distances, in some cases via dozens of slave units.

In one embodiment of an elevator system according to the third aspect of the invention, the elevator system can have a controller and serve several floors in a building under the control of the controller. The data network can extend along the several floors. A safety device can be arranged on each of the floors, which safety device is configured to determine data content and to transmit the data content to an assigned slave unit of the data network. Here, the elevator controller can be configured to receive data content from the master unit of the data network and to control a function of the elevator system on the basis thereof.

In other words, in the specific application of the data network proposed herein in an elevator system, the master unit can communicate with the elevator controller. Each of the slave units can communicate with one of the safety devices distributed over the elevator system. In this case, safety devices can be, for example, door switches that monitor correct closing of elevator shaft doors and/or car doors. Additionally or alternatively, safety devices can also monitor other properties within the elevator system that should be monitored for the safe and/or reliable operation thereof. Data content in the form of information about the property monitored by a safety device can then be communicated from the slave unit to the master unit via the data network. For this purpose, the slave unit can insert a corresponding datagram into a data telegram. The master unit can then forward its data content to the elevator control upon receipt of the data telegram. The elevator control can then control functions of the elevator system such as, for example, the operation of a drive machine that moves the elevator car. It can have an advantageous effect that the data communication described herein with the data network can be implemented particularly quickly, reliably, flexibly, and/or in a manner that is easy to configure.

It should be noted that some of the possible features and advantages of the invention are described herein with reference to different embodiments of the communication method on the one hand and the data network that can be used therefor and an elevator system equipped with such a data network on the other hand. A person skilled in the art recognizes that the features can be transferred, combined, adapted or replaced as appropriate in order to arrive at further embodiments of the invention.

Embodiments of the invention will be described below with reference to the accompanying drawings; neither the drawings nor the description are intended to be interpreted as limiting the invention.

The drawings are merely schematic and not to scale. Like reference signs refer to like or equivalent features in the various drawings.

DETAILED DESCRIPTION

Figure 1:
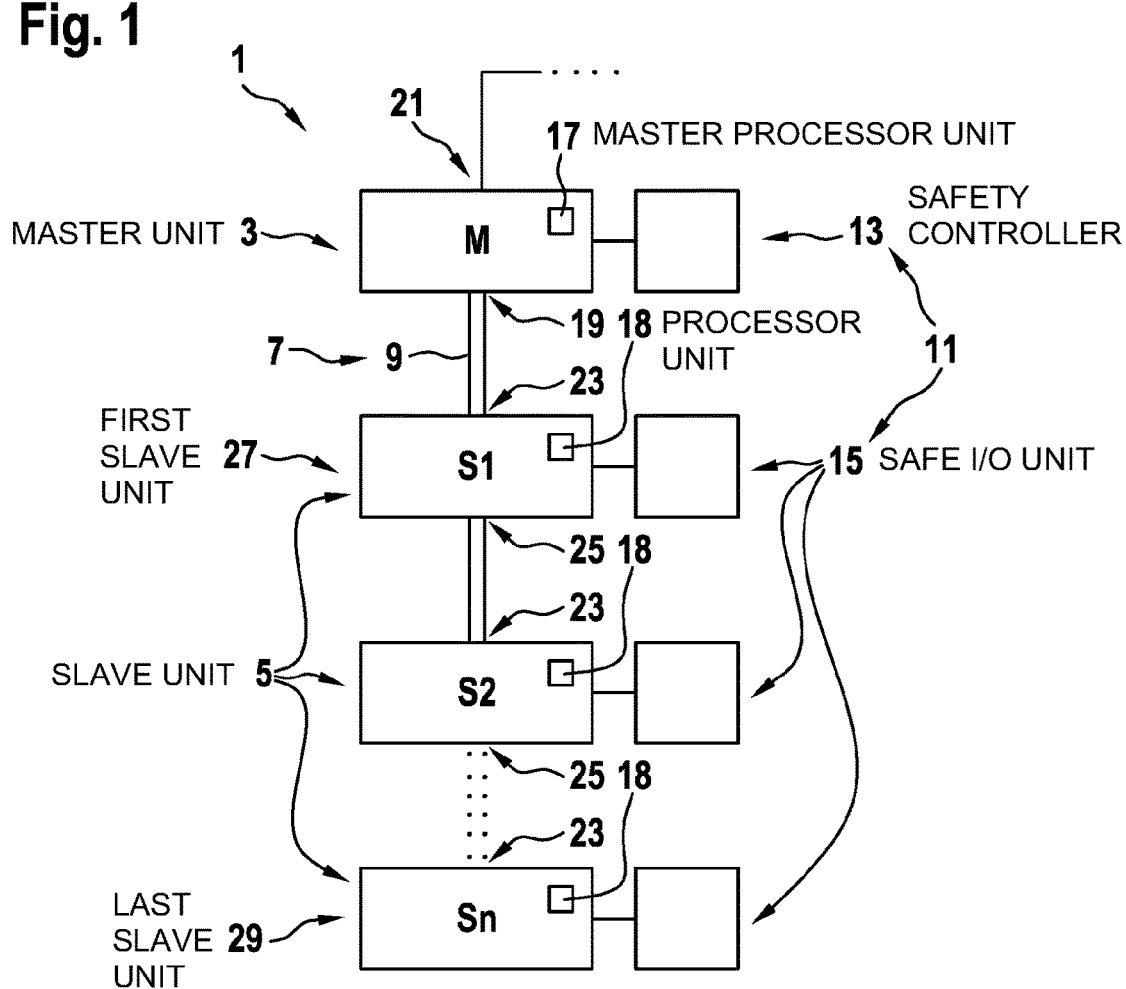
FIG. 1 shows a data network according to an embodiment of the present invention.

FIG. 1 shows a data network 1 by means of which data content can be communicated between different subscribers in the data network 1. The data network 1 comprises a master unit 3 and a plurality of slave units 5. The master unit is denoted by "M" and the slave units are denoted by "S1," "S2," . . . , "Sn." The master unit 3 and the slave units 5 are connected to one another via data communication paths 7 in the form of twisted double lines 9.

In the example shown, both the master unit 3 and each of the slave units 5 are each connected to a safety device 11 in the form of a circuit for the safe generation and/or processing of data content. In this case, the master unit 3 is connected to a safety controller 13, whereas each of the slave units 5 is connected to a safe input/output unit (Safe IO) 15. The safety devices 11 are designed in such a way that they meet increased safety requirements such as a safety integrity level SIL3.

In the example shown, the master unit 3 (M) and the slave units 5 (S1-Sn) are connected to one another in series to form a chain via the data communication paths 9. The master unit 3 has a master processor unit 17 and a data connection 19. Optionally, the master unit 3 can also have a further connection in the form of an external connection 21, via which the master unit 3 can communicate with other electronic devices, for example via an external network such as a normal Ethernet. Each of the slave units 5 has a processor unit 18, a first data connection 23 and a second data connection 25. With the exception of a first slave unit 27 (S1) and a last slave unit 29 (Sn), the first data connection 23 of a slave unit 5 and the second data connection 25 of a slave unit 5 adjacent thereto are connected to one another via one of the data communication paths 7. The first data connection 23 of the first slave unit 27 is connected to the data connection 19 of the master unit 3. The optionally available second data connection 25 of the last slave unit 29 remains unused.

Figure 2:
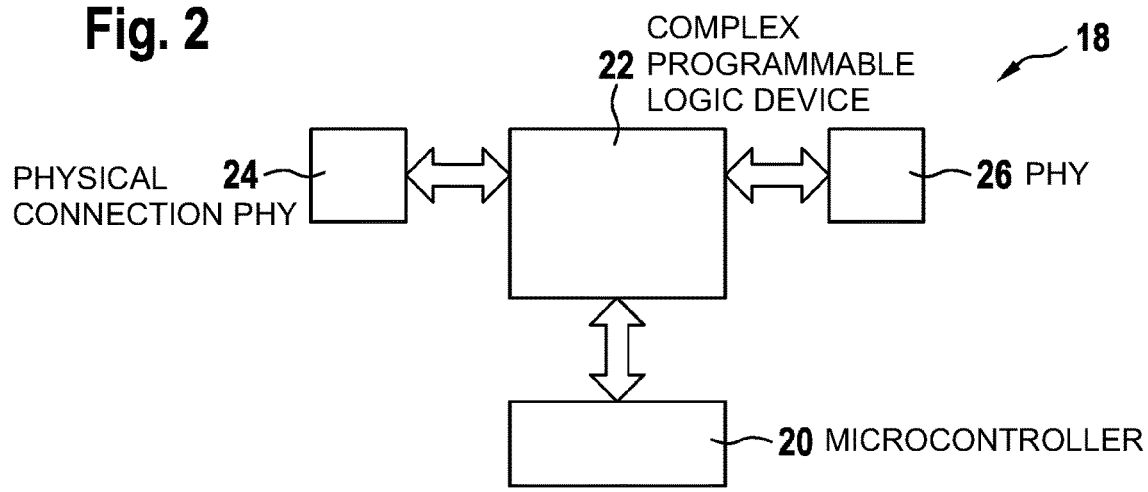
FIG. 2 shows a processor unit of a slave unit of the data network from FIG. 1.

According to FIG. 2, a processor unit 18 of a slave unit 5 has a microcontroller 20 which is in communication with a complex programmable logic device/CPLD 22. The CPLD 22 is arranged between two physical connections/PHYs 24, 26 and communicates with the two PHYs 24, 26. The two PHYs can be formed, for example, by a TJA1102 dual-port Ethernet PHY from NXP Semiconductors of Eindhoven, Netherlands. The CPLD 22 is configured in such a way that it forwards data substantially without delay, i.e. while the data of the same data telegram is still being received. For this purpose, the first PHY 24 is connected to the first data connection 23 and the second PHY 26 is connected to the second data connection 25 of the slave unit 5.

Figure 3:
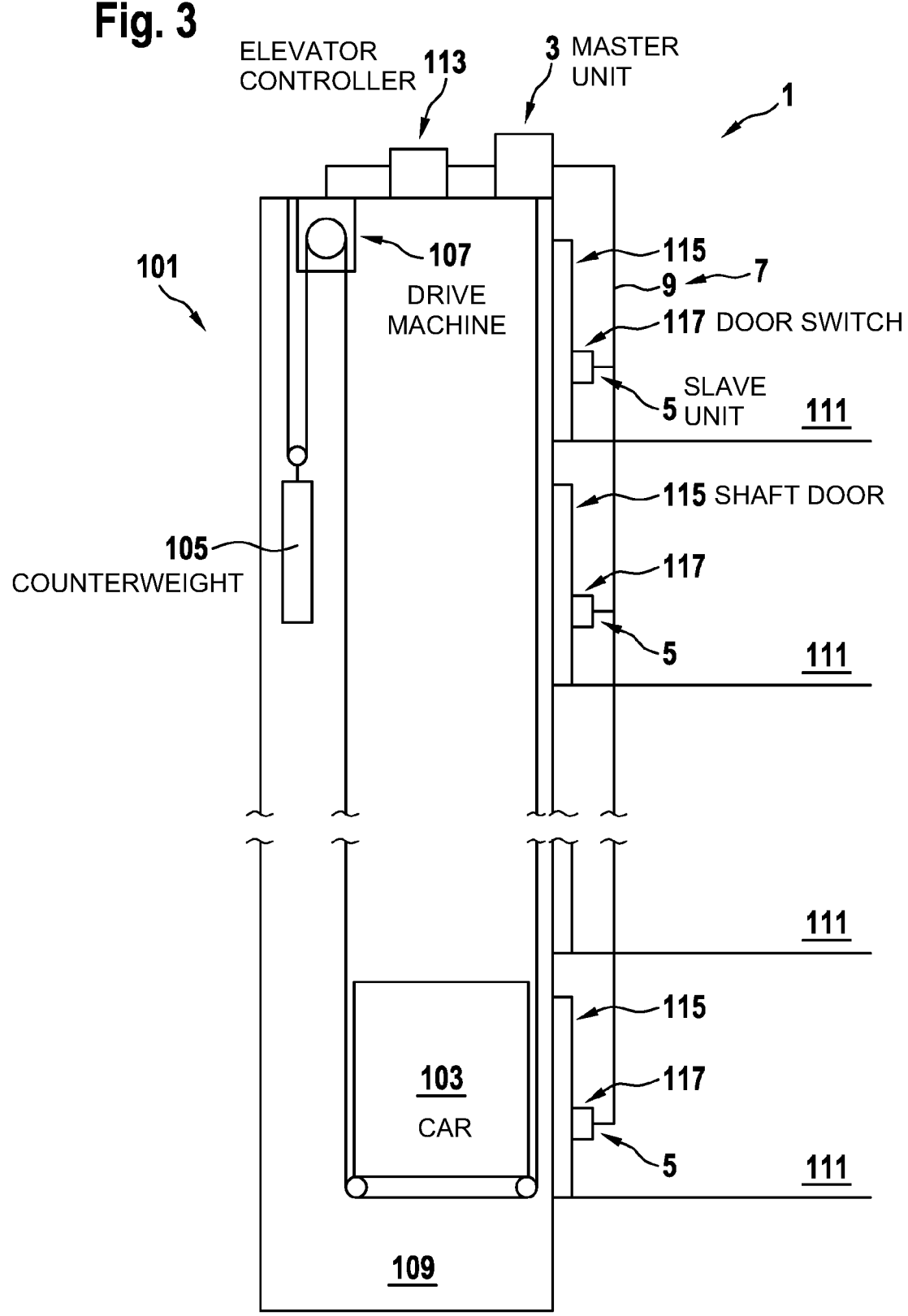
FIG. 3 shows an elevator system according to an embodiment of the present invention.

FIG. 3 shows an elevator system 101 in which a data network 1 is implemented. In the elevator system 101, an elevator car 103 and a counterweight 105 can be displaced vertically within an elevator shaft 109 by means of a drive machine 107 and, in the process, moved to different floors 111. The operation of the drive machine 107 is controlled by an elevator controller 113. A shaft door 115 is provided on each of the floors 111, by means of which access to the elevator shaft 109 or the elevator car 103 located behind it can be blocked or opened. A current closed state of each of these shaft doors 115 is monitored by means of a door switch 117 provided on each shaft door 115. The door switch 117 forms a safety device 11, 15 (see FIG. 1) which, depending on whether the shaft door 115 is open or closed, determines and outputs a corresponding signal or data.

In order to be able to transmit the information about the closed states of the multiple shaft doors 115 to the elevator controller 113 in a manner similar to a conventional safety chain, data communication is established between the door switches 117 and the elevator control 113 by means of the data network 1 presented herein. Each of the door switches 117 can transmit its signals or data to an assigned slave unit 5 of the data network 1 as a safety device 11. The data can then be communicated to the master unit 3 via the data network 1 and transferred therefrom to the elevator controller 113.

Figure 4:
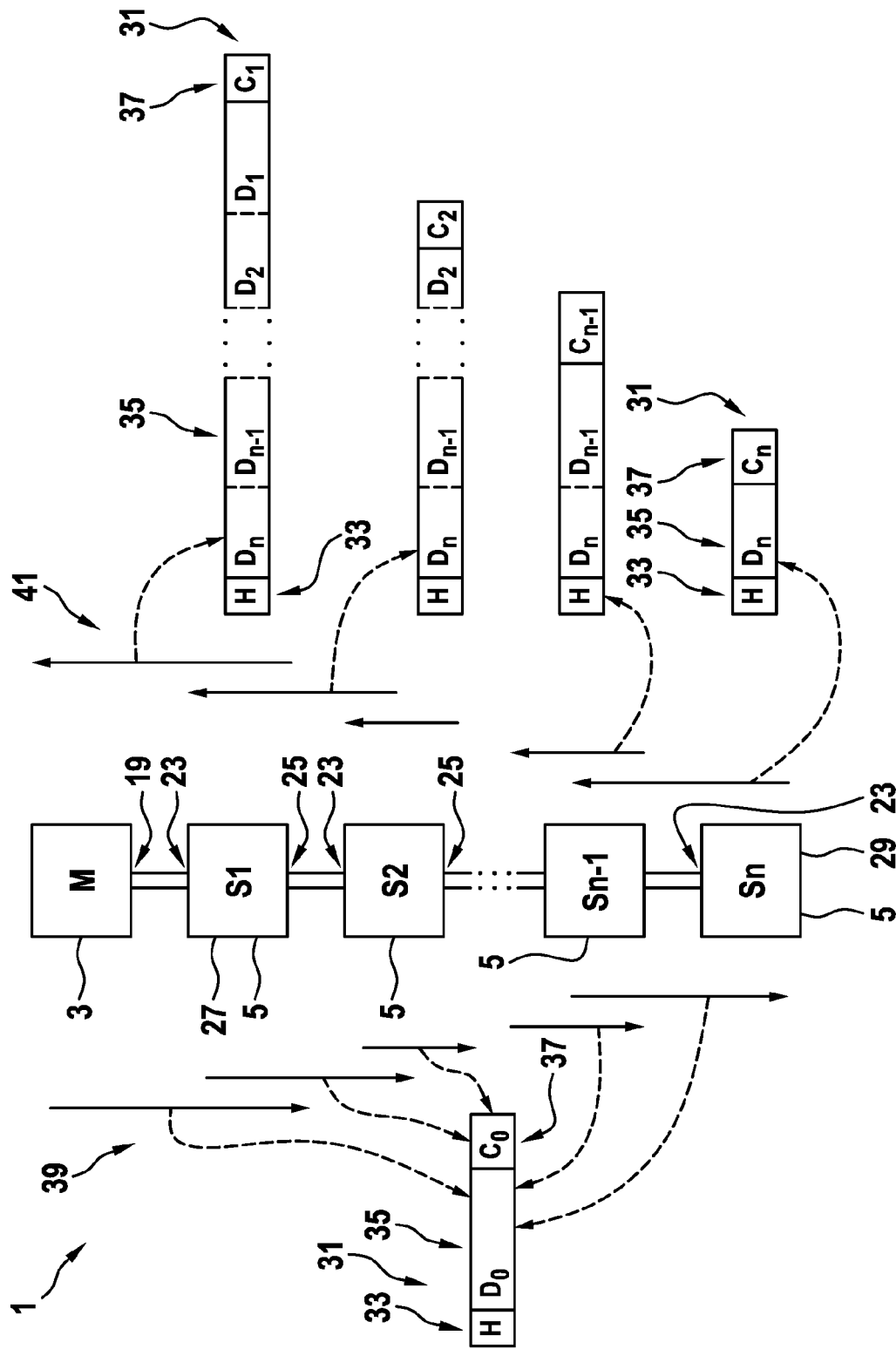
FIG. 4 illustrates a data communication method according to an embodiment of the present invention.

Possible details of the data communication to be established via the data network 1 are explained below, also with reference to FIG. 4.

In the context of data communication, data content is stored in data telegrams 31 or read out therefrom. The data telegrams 31 are composed of a large number of consecutive bits. Each data telegram 31 has a header 33 (H), a datagram region 35 and a checksum 37 ($C_x$). A datagram region 35 comprises one or more datagrams $D_1, D_2, \ldots, D_{n-1}, D_n$.

In order to be able to establish data communication via the data network 1, the master unit 3 is configured to transfer a data telegram 31 with a header H, a datagram region 35 with a datagram Do and a checksum Co via its data connection 19 to the adjacent first slave unit 27. The datagram Do can contain, for example, instructions to one, several or all of the slave units 5. The master unit 3 thus sends the data telegram 31 via the chain-like data network 1 in the direction of an outward data path 39 to the last slave unit 29.

Each of the slave units 5, with the exception of the last slave unit 29, is configured to forward a data telegram 31 coming from a direction from the master unit 3 and received at its first data connection 23 in a direction toward the last slave unit 29 via its second data connection 25. The particular slave unit 5 forwards the data telegram 31 coming from a preceding adjacent slave unit 5 to a subsequent adjacent slave unit 5. On the outward data path 39, this forwarding takes place substantially without delay, i.e. the slave unit 5 forwards received parts of a data telegram 31 to the next adjacent slave unit 5 with as little delay as possible, i.e. preferably bit by bit, while it is still receiving other parts of the same data telegram 1. The content of the data telegram 31 is not modified by any of the slave units 5 during the outward data path 39. Accordingly, the checksum 37 in the data telegram 31 does not need to be changed during the outward data path 39.

A slave unit 5 located at the end of the chain recognizes its status as the last slave unit 29 due to the fact that it is only connected to a single adjacent slave unit 5. Accordingly, its optionally available second data connection 25 is not used.

As soon as the data message 31 originally sent by the master unit 3 reaches the last slave unit 29 (Sn), this last slave unit 29 forwards the received data message 31 via its first data connection 23 back in the direction toward the master unit 3, i.e. to the penultimate slave unit 5 (Sn-1), so that the data telegram 31 then moves along the chain in the data return path 41. The last slave unit 29 (Sn) waits, in particular after the complete receipt of the data telegram 31, for a short, adjustable period of time, for example in the range between 0.2 and 0.8 milliseconds, before it returns the data telegram 31. During the data return path 41, however, the slave units 5 (including the last slave unit 29 (Sn)) do not simply pass on the data message 31 unchanged to the next adjacent slave unit 5. Instead, each of the slave units 5 appends a piece of data content in the form of a datagram $D_1$, $D_2, \ldots, D_{n-1}, D_n$ additionally after a last previously stored datagram in the datagram region 35 of the data telegram 31. The datagram Do sent by the master 3 is in particular overwritten. It could also be sent back to the master 3.

Since the data telegram 31 is modified each time it is forwarded from one slave unit 5 to the next slave unit 5, all slave units 5, upon receipt of the data telegram 31, also check its checksum 37 in order to be able to assess the integrity of the transmitted data. Furthermore, after each slave unit 5 has stored its data content in the form of a supplementary datagram in the datagram region 35 of the data telegram 31, it calculates a new checksum 37 based on the bits in the rest of the supplemented data telegram 31 and appends this new checksum 37 to the end of the data telegram 31. The previous checksum 37 is thus updated or replaced.

On the outward data path 39, the processor units 18 (see FIG. 1) of the slave unit 5 read the data telegram 31 and evaluate it. If the data telegram 31 contains a request to the particular slave unit 5 to transmit information to the master unit 3 on the data return path 41, the particular processor unit 18, immediately after receiving and evaluating the corresponding instruction, begins compiling the requested information and, if possible, providing it in the CPLD 22 (see FIG. 2).

Figure 5:
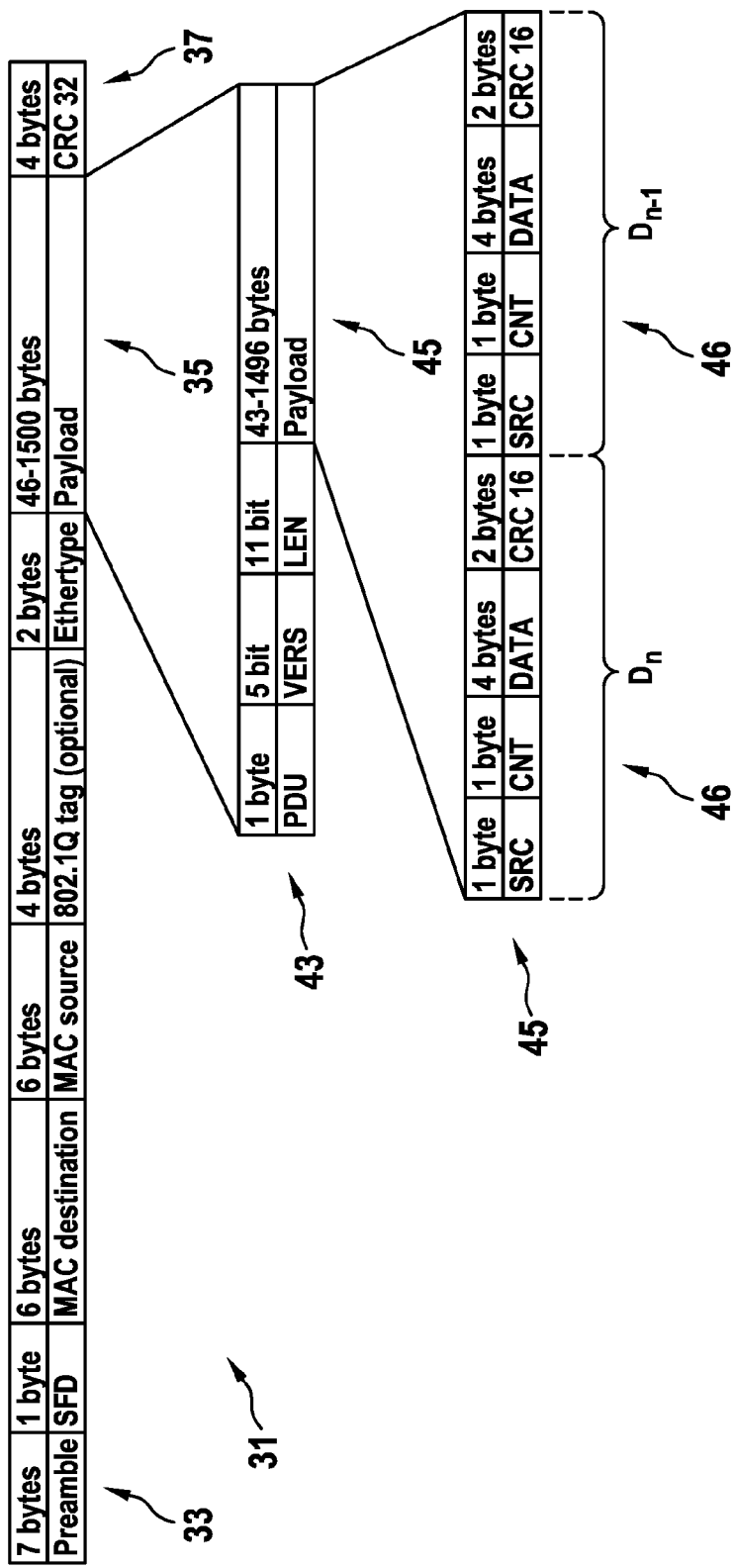
FIG. 5 shows an exemplary data structure of a data telegram for a data communication method according to an embodiment of the present invention.

FIG. 5 illustrates a data telegram 31 by way of example. Possible or optional configurations, bit lengths and contents of the data recorded in the data telegram 31 are specified in the header 33, the datagram region 35 and the checksum 37.

In principle, the data telegram 31 is structured according to the Ethernet data block format Ethernet-II in accordance with IEEE 802.3. The header 33 begins with a 7-byte long preamble, which is followed by a so-called start frame delimiter (SFD) with a length of one byte. This is followed by the destination and source MAC addresses (MAC destination, MAC source) with a length of 6 bytes each. The destination MAC address identifies the network station that is to receive the data telegram 31 and the source MAC address identifies the network station that sent the data telegram 31. This is optionally followed by what is known as a VLAN tag (802.1Q tag) having a length of 4 bytes. This is followed by a type specification (Ethertype) with a length of 2 bytes, which closes the header 33. Different types of data telegrams 31 can be distinguished on the basis of the type specification. The type specification also defines whether the data telegram 31 is transmitted in accordance with the conventional Ethernet standard or with the method described here for safety-relevant data. The header 33 is followed by the datagram region 35 (payload) of the data telegram 31, which can have a length between 46 and 1500 bytes. The data telegram 31 is terminated by the checksum (CRC32) with a length of 4 bytes.

In the example shown, the datagram region 35 is configured as a safety frame 43. This is specified and identified by a special type specification not used in the conventional Ethernet standard, for example 0xEEB0. The safety frame 43 begins with a data identifier (PDU) with a length of one byte. The data identifier specifies the type of data transmitted within the safety frame. It thus has a comparable function for the safety frame 43 as the type specification (Ethertype) for the entire data telegram 31. The data identifier is followed by version information (VERS) with a length of 5 bits. The version information indicates the version according to which the safety frame 43 is constructed. The version information is followed by length information (LEN) with 11 bits. The length information specifies the length of the subsequent user data 45 (payload) of the safety frame 43. This user data 45 can comprise between 43 and 1496 bytes.

The user data 45 of the safety frame 43 are composed of identically structured datagrams 46 arranged one behind the other (in FIG. 4 $D_1$-$D_n$) with a length of 8 bytes each. The maximum length of the user data 45 of 1496 bytes results in a maximum number of 187 datagrams 46. Each datagram 46 begins with source information (SRC) one byte long, which identifies the slave unit 5 sending the datagram 46. This is followed by a one-byte-long counter (CNT) which is incremented by the slave unit 5 each time a datagram 46 is sent. It can thus be checked whether the slave unit 5 is still functioning properly. This is then followed by 4 bytes of data (DATA) which the slave unit 5 transmits in the datagram 46. The datagram 46 is concluded by a 2-byte checksum (CRC 16, cyclic redundancy check with 16 bits), which is calculated analogously to the checksum 37 of the data telegram 31 and is used to check the integrity of the datagram 46.

In the example shown, the useful data 45 of the safety frame 43 include two datagrams 46 arranged one behind the other. Usually, each slave unit 5 appends a datagram 46 to the user data 45 of the safety frame 43 on the data return path 41. This shows the structure of the user data 45 after the datagram 46 of the penultimate slave unit Sn-1 has been appended. The datagram 46 of the penultimate slave unit Sn-1 (datagram $D_{n-1}$ in FIG. 4) follows the datagram 46 of the last slave unit Sn (datagram $D_n$ in FIG. 4).

It would also be possible for a slave unit 5 to append more than one datagram 46 to the user data 45 of the safety frame 43. This could be the case if the corresponding slave unit 5 would like to transmit more than 4 bytes of data.

The data communication or the hardware components used in the data network 1 in the form of, for example, PHYs and CPLDs are in principle designed for full-duplex communication. Downward communication coming from the master unit 3 in the outward data path 39 to one or more slave units 5 can preferably be initiated exclusively by the master unit 3. During this outward data path 39, the slave units 5 pass the data telegram 31 on as quickly as possible on the fly and unchanged, but can "listen in" to its content. During the subsequent data return path 41, the slave units 5 also forward the data telegram 31 on the fly with the least possible time delay, but in doing so optionally additionally store their own data content as datagrams in the data telegram 31 as described and then also update the checksum 37.

The data communication in the direction of the data return path 41 can thus be initiated by the master unit 3 by the master unit initially sending a data telegram 31 along the outward data path 39 and the data telegram 31 then being returned from the last slave unit 29 on the data return path 41.

Alternatively, the slave units 5 themselves can spontaneously initiate data communication in the direction of the data return path 41. For this purpose, a slave unit 5 can actively output a data telegram 31 at its first data connection 23 and thus send it to the adjacent slave unit 5 on the data return path 41 to the master unit 3. However, the slave unit 5 should perform collision handling before actively starting such data communication and send a data telegram of its own accord only if no other data telegram 31 currently needs to be received and forwarded by the slave unit 5.

With the approach of data communication described herein and a data network 1 that can be used for this purpose with the described acceptable restrictions and a specialized protocol, physical connections, i.e. PHYs, which were originally developed for the Ethernet standard IEEE 802.3bw 100BASE-T1 for the automotive industry and have so far been used inexpensively, quickly and robustly for data communication over short distances in cars, can also be used for other applications.

In particular, the modifications described can allow applications in areas such as elevator systems, for example, in which data must be communicated over relatively long distances. The physical location of the 100BASE-T1 is able to combine different applications via a standard IP protocol for non-safety-critical data telegrams with the safety-critical protocol specified in this document for safety-critical data telegrams. The safety-critical and non-safety-critical data telegrams are distinguished on the basis of their type specification (Ethertype) in the header. The signal or the data telegram is passed through the 100BASE-T1 line, which is capable of full-duplex communication, from node to node in one direction of an outward data path and a data return path at the same time.

Finally, it should be noted that terms such as "comprising," "having," etc. do not preclude other elements or steps, and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for communicating data content within a data network, the data network including a master unit and a plurality of slave units being connected to one another in series to form a chain via data communication paths to exchange data telegrams between one another, the method comprising the steps of:
   forming a data telegram having a header, a datagram region and a checksum, the datagram region being adapted for serial storage of a plurality of datagrams, each of the datagrams including a piece of data content to be communicated and the checksum being calculated uniquely on a basis of bits in a remainder of the data telegram;
   the master unit transmitting the data telegram to a first slave unit of the slave units on an outward data path including all of the slave units up to a last slave unit of the slave units;
   each of the slave units, except for the last slave unit, receiving at a first data connection the data telegram from a direction from the master unit and forwarding via a second data connection the data telegram in a direction toward the last slave unit, and receiving at the second data connection the data telegram from a direction from the last slave unit and forwarding via the first data connection the data telegram in a direction toward the master unit;
   the last slave unit initiating a data return path by returning the data telegram received from the direction from the master unit at a first data connection in the direction toward the master unit via the first data connection;
   wherein the slave units are adapted to modify the data telegram only during the data return path; and
   wherein each of the slave units has a processor unit for forwarding and modifying the data telegram, at least one of the processor units being adapted to read and evaluate the data telegram on the outward data path and, when the data telegram contains a request to transmit information to the master unit on the data return path, the at least one processor unit immediately begins compiling the requested information after receiving and evaluating the request in the data telegram.

2. The method according to claim 1 wherein the data network is implemented in an elevator system.

3. The method according to claim 1 wherein the last slave unit waits for an adjustable period of time before initiating the data return path.

4. The method according to claim 1 including when one of the slave units is receiving the data telegram from the master unit or from an adjacent one of the slave units, the one slave unit forwards parts of the data telegram, while it is being received, to another adjacent slave unit or to the master unit.

5. The method according to claim 4 including checking the checksum of the data telegram, appending a supplementary datagram after a last datagram stored in the datagram region, wherein the supplementary datagram has a piece of data content to be communicated by the one slave unit, and calculating a new checksum on a basis of bits in a rest of the data telegram expanded by the supplementary datagram and appending the calculated checksum to an end of the data telegram.

6. The method according to claim 1 wherein each of the slave units independently actively starts data communication with the master unit by sending another data telegram to the master unit for this purpose, and wherein each of the slave units performs collision handling before actively starting the data communication with the master unit and sends the another data telegram only when not currently receiving and forwarding the data telegram.

7. The method according to claim 1 wherein the data communication paths formed as a twisted double line.

8. A data network for communicating data content, the data network comprising:
- a master unit;
- a plurality of slave units connected with the master unit via data communication paths for exchanging data telegrams between one another, wherein the master unit and the slave units are connected in series to form a chain via the data communication paths;
- wherein each of the data telegrams includes a header, a datagram region and a checksum, the datagram region being adapted for serial storage of a plurality of datagrams, each of the datagrams including a piece of data content to be communicated, and wherein the checksum is calculated uniquely on a basis of bits in a remainder of the data telegram;
- wherein the master unit has a master processor unit and at least one data connection and each of the slave units has an associated processor unit and first and second data connections;
- wherein the master unit is adapted to transmit the data telegrams via the at least one data connection to a first slave unit of the slave units on an outward data path up to a last slave unit of the slave units;
- wherein each of the slave units, except the last slave unit, is adapted to forward the data telegrams received at the first data connection from a direction from the master unit in a direction toward the last slave unit via the second data connection, and to forward the data telegrams received at the second data connection from a direction from the last slave unit in a direction toward the master unit via the first data connection;
- wherein the last slave unit is adapted to initiate a data return path by returning the data telegrams received at the first data connection from the direction from the master unit in the direction toward the master unit via the first data connection;
- wherein each of the slave units is adapted to modify the data telegrams exclusively during the data return path; and
- wherein the processor unit associated with at least one of the slave units is adapted to read and evaluate the data telegrams on the outward data path and, when any of the data telegrams contains a request to the at least one slave unit to transmit information to the master unit on the data return path, the processor unit associated with the at least one slave unit begins compiling the requested information immediately after receiving and evaluating the corresponding request.

9. The data network according to claim 8 being implemented in an elevator system wherein the master unit is connected to an elevator controller and each of the slave units is connected to an associated door switch.

10. The data network according to claim 8 wherein the last slave unit is adapted to wait for an adjustable period of time before initiating the data return path.

11. The data network according to claim 8 wherein each of the slave units is adapted to receive the data telegrams from the master unit or from an adjacent one of the slave units and to forward parts of the data telegrams being received to an adjacent one of the slave units or to the master unit.

12. The data network according to claim 11 wherein each of the slave units is adapted to check the checksum of each of the data telegrams and to append a supplementary datagram after a last stored datagram in the datagram region, wherein the supplementary datagram includes a piece of data content to be communicated by the slave unit, to calculate a new checksum on a basis of bits in a rest of the data telegram expanded by the supplementary datagram and to append the newly calculated checksum to an end of the data telegram.

13. The data network according to claim 8 wherein each of the slave units is adapted to actively start data communication with the master unit independently and to send another data telegram to the master unit, wherein each of the slave units is adapted to perform collision handling before actively starting the data communication and to then send the another data telegram only when the slave unit is currently not receiving and forwarding one of the data telegrams.

14. The data network according to claim 8 wherein the data communication paths are twisted double lines.

15. An elevator system having the data network according to claim 8.

16. The elevator system according to claim 15 comprising:
- a controller;
- an elevator car that serves several floors in a building under control of the controller;
- wherein the data network extends along the several floors;
- a safety device arranged on each of the floors, the safety devices being adapted to determine data content and to transmit the data content to an assigned one of the slave units of the data network; and
- wherein the elevator controller receives the data content from the master unit of the data network and controls a function of the elevator system based on the data content.

* * * * *